United States Patent [11] 3,584,198

[72] Inventors Kazuo Doi;
 Ryuzo Kato; Tadashi Matsumoto; Fujio
 Niizuma; Shigenori Kugumiya; Yasuo
 Tanaka; Motoharu Kitamura, all of
 Kadoma, Osaka, Japan
[21] Appl. No. 802,071
[22] Filed Feb. 25, 1969
[45] Patented June 8, 1971
[73] Assignee Matsushita Denko Kabushiki Kaisha
 Osaka, Japan
[32] Priority Feb. 29, 1968, Feb. 29, 1968, Feb. 29,
 1968, Feb. 29, 1968, Feb. 29, 1968, Feb.
 29, 1968, Feb. 29, 1968, Feb. 29, 1968
[33] Japan
[31] 43/16031, 43/19314, 43/31529, 43/45504,
 43/25976, 43/45516, 43/51520 and
 43/58172

[54] FLEXIBLE ELECTRIC SURFACE HEATER
 1 Claim, 19 Drawing Figs.
[52] U.S. Cl........................................................ 219/549,
 219/528, 219/544, 338/212
[51] Int. Cl................................................................ H05b 3/36
[50] Field of Search............................................ 219/211-
 —13, 345, 528-7-9, 549-3-4; 338/212

[56] References Cited
UNITED STATES PATENTS
2,666,839 1/1954 Boctel............................ 219/528
2,719,213 9/1955 Johnson......................... 338/212
3,031,739 5/1962 Boggs............................ 219/345X
3,215,574 11/1965 Korb............................. 219/212UX
3,423,574 1/1969 Shomphe et al.............. 219/528

Primary Examiner—Harold Broome
Attorney—Wolfe, Hubbard, Leydig, Voit and Osann

ABSTRACT: A flexible electric surface heater comprises at least two flexible and heatproof plastic films and an electrically heat generating metal foil formed in a zigzag form between said plastic films through a thermoplastic resin as a filler. An excess heat detecting electrode is embedded also between the plastic films along the zigzag metal foil so as to oppose thereto with a fixed distance through the filler, and is connected to a protective device for interrupting power supply when extraordinary heat is detected at the electrode. The surface heater is continuously manufactured by laminating the metal foil on one of the plastic, forming the zigzag heater line as well as the electrode by means of an etching process, and further laminating another plastic film.

INVENTORS
KAZUO DOI
RYUZO KATO
TADASHI MATSUMOTO
FUJIO NIIZUMA
SHIGENORI KUGUMIYA
YASUO TANAKA
MOTOHARU KITAMURA

BY Wolfe, Hubbard, Voit & Osann
ATTORNEYS

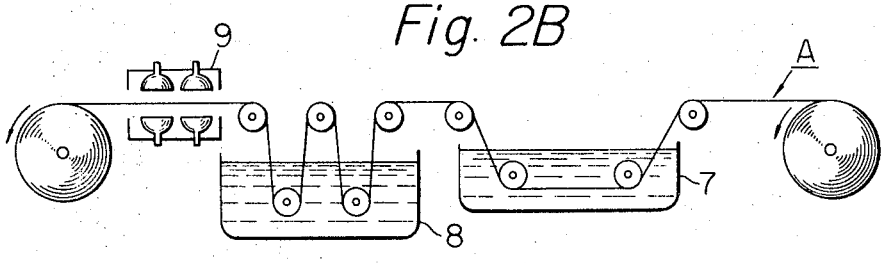
Fig. 2B
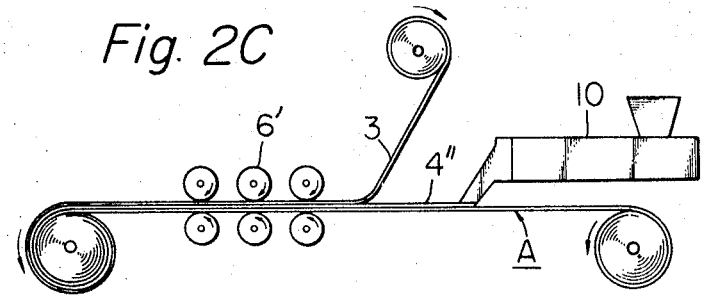
Fig. 2C
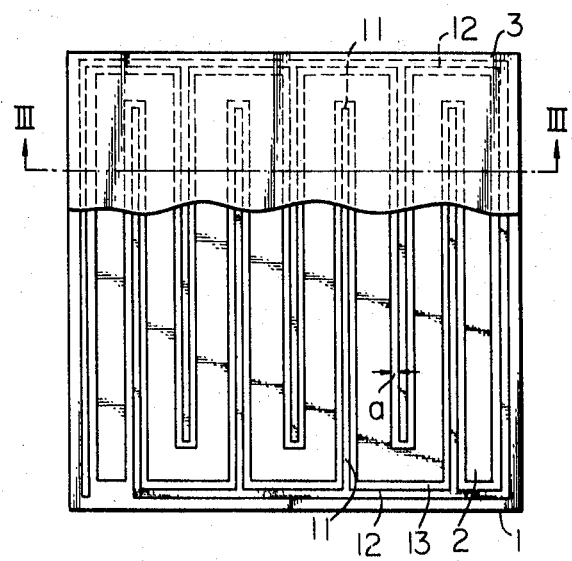
Fig. 3A
Fig. 3B
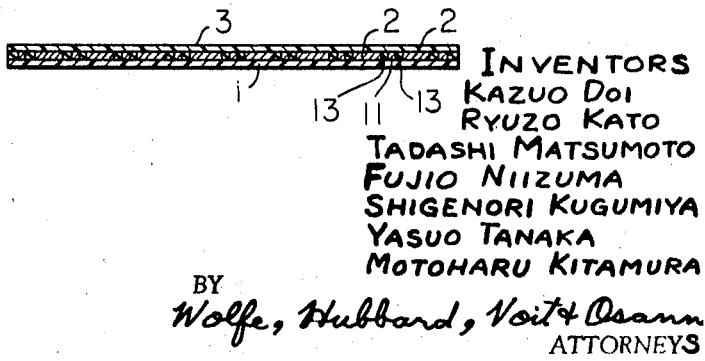
INVENTORS
KAZUO DOI
RYUZO KATO
TADASHI MATSUMOTO
FUJIO NIIZUMA
SHIGENORI KUGUMIYA
YASUO TANAKA
MOTOHARU KITAMURA
BY Wolfe, Hubbard, Voit & Osann
ATTORNEYS INVENTORS
KAZUO DOI
RYUZO KATO
TADASHI MATSUMOTO
FUJIO NIIZUMA
SHIGENORI KUGUMIYA
YASUO TANAKA
MOTOHARU KITAMURA BY *Wolfe, Hubbard, Voit & Osann*

ATTORNEYS

INVENTORS
KAZUO DOI
RYUZO KATO
TADASHI MATSUMOTO
FUJIO NIIZUMA
SHIGENORI KUGUMIYA
YASUO TANAKA
MOTOHARU KITAMURA

BY Wolfe, Hubbard, Voit & Osann
ATTORNEYS

INVENTORS
KAZUO DOI
RYUZO KATO
TADASHI MATSUMOTO
FUJIO NIIZUMA
SHIGENORI KUGUMIYA
YASUO TANAKA
MOTOHARU KITAMURA

BY
Wolfe, Hubbard, Voit & Osann
ATTORNEYS

INVENTORS
KAZUO DOI
RYUZO KATO
TADASHI MATSUMOTO
FUJIO NIIZUMA
SHIGENORI KUGUMIYA
YASUO TANAKA
MOTOHARU KITAMURA

BY Wolfe, Hubbard, Voit & Osann
ATTORNEYS

FLEXIBLE ELECTRIC SURFACE HEATER

This invention relates to such an electric surface heater and a method of manufacturing the same, that formed in a plane and flexible member, in which an electrically heat generating line consisting of a metallic foil is sealed through a filler between plastic films, respective which being flexible and high in heatproofness and electric-insulativeness.

Conventional surface heaters of the kind have been involved in such various defects that, for example, breaking or disconnecting accidents of the heat generating line have been easily occurred since any consideration of making respective thermal expansion coefficients of the heat generating line and external covering sheet for protecting the line substantially equal to each other has been made, and that the heaters have been lacking in safety and difficult to be used or adhered to each other as bent or folded back since thermostat elements to be assembled in the surface heater have not been of the type that is flexible but rather that having a certain thickness.

The present invention has been suggested to remove such defects as above of conventional electric surface heaters.

Thus the principal object of the present invention is to provide an electric surface heater which is not in danger of causing any line breaking accidents to occur even though the heat generating line is formed of an extremely thin metal foil.

It is another object of the present invention to provide an electric surface heater which is high in safety characteristics with a provision of flexible and thin type safety device that will be actuated in response to sensing of any excessive temperature rise, and which further is easily treated upon mounting operation with its high flexibility.

It is another object of the present invention to provide a surface heater which allows to readily represent thereon decorative pattern or design or any reference symbols.

It is a further object of the present invention to provide an electric surface heater which is readily adaptable to various usages by varying heat generating amount per a unit of area at each part of the heater.

Other objects and advantages of the invention will become apparent upon reading the following detailed description and upon reference to the attached drawings in which.

Figure 2A:
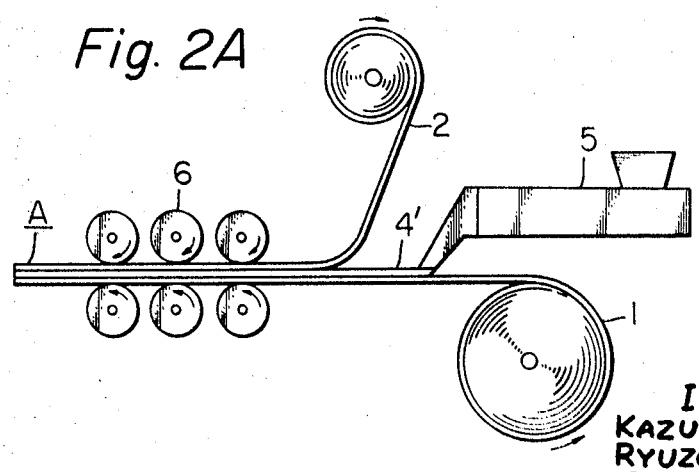
Figure 3C:
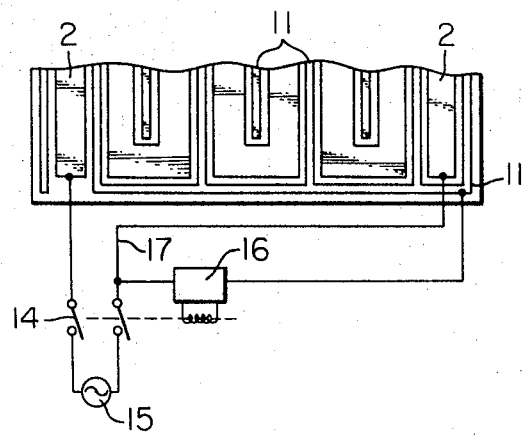
Figure 4A:
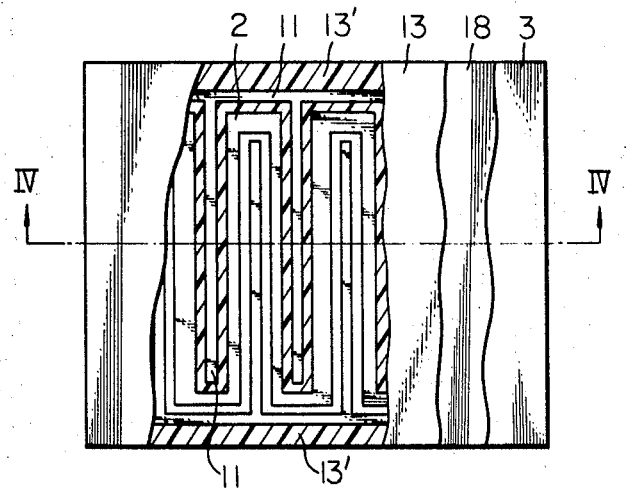
Figure 4B:
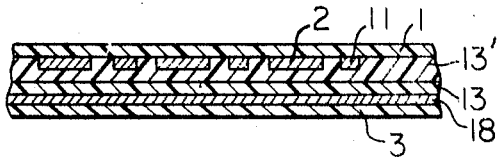
Figure 4C:
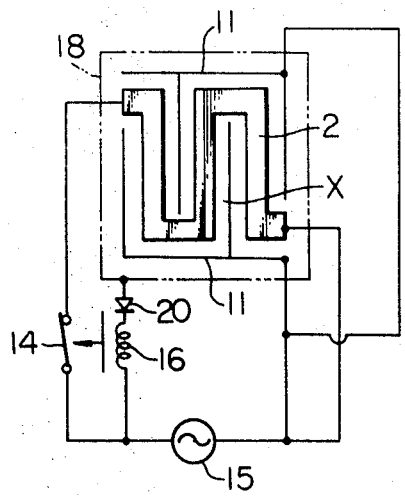
Figure 4D:
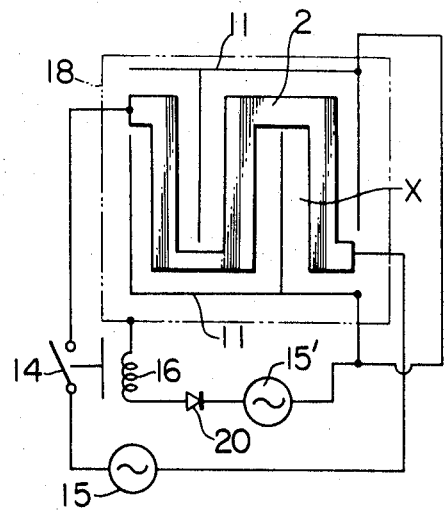
Figure 5A:
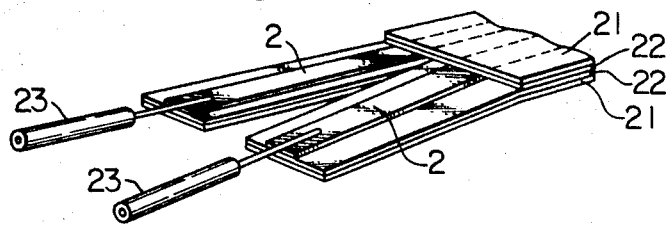
Figure 5B:
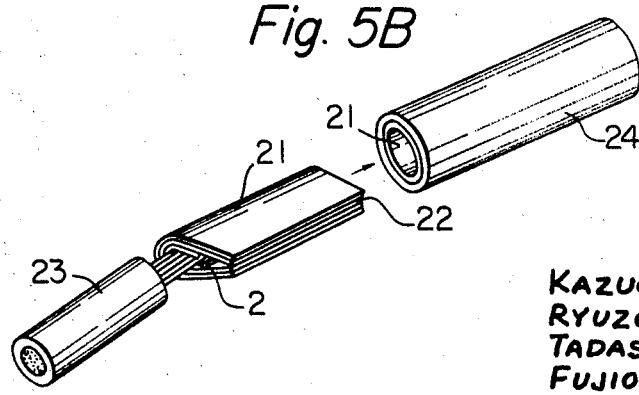
Figure 6A:
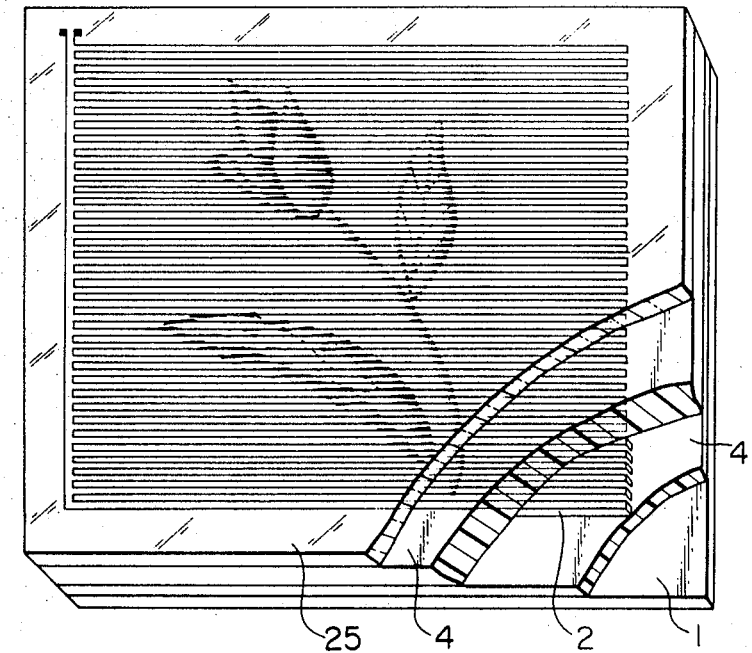
Figure 6B:
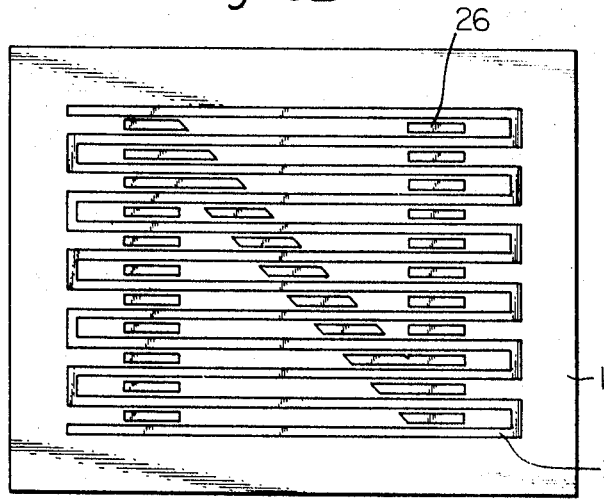
Figure 7:
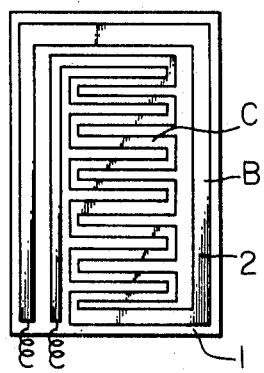
Figure 8A:
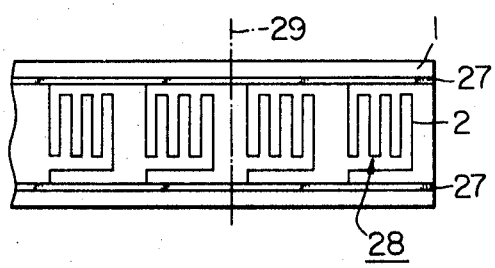

FIGS. 2A—2C inclusive are diagrams showing steps of the method of manufacturing the electric surface heater according to the present invention, respectively;

FIG. 3A is a plan view of another embodiment of the present invention, in which an insulating film at a surface of the heater is shown as partly removed;

FIG. 3B is a sectioned view taken along the line III–III in FIG. 3A;

FIG. 3C is a wiring diagram of the heater under use;

FIG. 4A is a plan view of another embodiment, in which an insulating film at a surface of the heater is shown as partly removed;

FIG. 4B is a sectioned view taken along the line IV–IV in FIG. 4A;

FIGS. 4C and 4D show examples of wiring diagram of the heater under use;

FIGS. 5A and 5B are perspective view showing connection of lead wires;

FIGS. 6A and 6B show further embodiments of the invention, respectively;

FIG. 7 shows another embodiment of the invention;

FIG. 8A shows a further embodiment of the invention; and

Figure 8B:
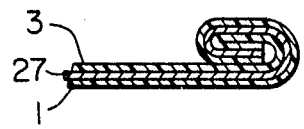

FIG. 8B shows an insulating method at peripheral edges of the surface heater according to the present invention.

While the invention has been described with reference to certain preferred embodiments, it will be understood that it is not intended to limit the invention to the particular embodiments shown but rather intended, on the contrary, to cover the various alternatives and equivalent forms of the invention as covered by the spirit and scope of the appended claims.

Figure 1A:
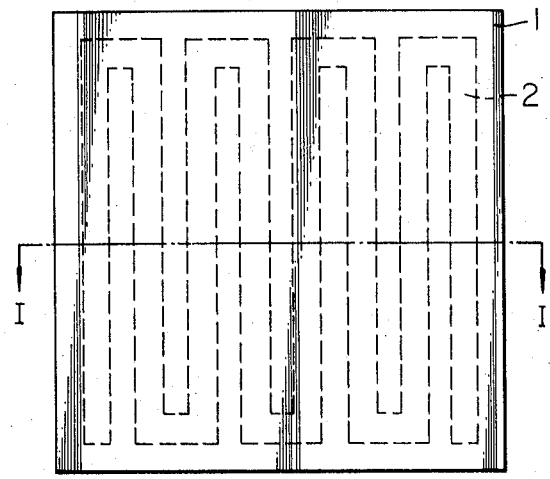
FIG. 1A is a plan view of the electric surface heater according to the present invention.
Figure 1B:
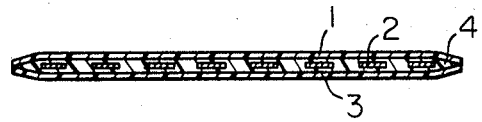
FIG. 1B is a sectioned view taken along the line I–I in FIG. 1A.

Turning now to the drawings, there is shown in FIGS. 1A and 1B an embodiment of the invention. In the drawings, 1 and 3 are respectively a plastic film which having a flexibility, heatproofness and high insulativeness, and 2 is a heat generating member consisting of a metal or an alloy film. The heat generating member 2 is embedded between the above-mentioned insulating films 1 and 3 through a filler 4 which consists of such a thermoplastic resin as polyethylene, polyamide, polyvinyl formal, polyurethane series adhesives, nitrile rubber or the like. The member 2 will be formed in a lattice or a zigzag form as shown in FIG. 1A.

For said plastic films 1 and 3, any of such materials as shown in the following Table 1 will be used, respective which having characteristics as listed therein.

TABLE 1

| Kind of the film | Thermal Expansion Coefficient | Temperature for use (Numerical Value) |
|---|---|---|
| Polyamide | $2.0 \times 10^{15}/°C.$ | 400° C. |
| Saturated Polyester film | $2.7 \times 10^{15}/°C.$ | 150° C. |
| Polytrifluoroethylene | $4.5 \times 10^{15}/°C.$ | 200° C. |
| Polycarbonate | $7.0 \times 10^{15}/°C.$ | 140° C. |

Further, for the said heat generating member 2, any of such materials as in the following Table 2, respective which having characteristics as listed therein.

TABLE 2

| Material | Thermal Expansion Coefficient |
|---|---|
| Fe | $1.17 \times 10^{15}/°C.$ |
| Cu | $1.65 \times 10^{15}/°C.$ |
| Sn(90)—Pb(10) | $2.2 \times 10^{15}/°C.$ |
| Al | $2.4 \times 10^{15}/°C.$ |
| Zn | $3.9 \times 10^{15}/°C.$ |

As above, such a material for the plastic film 1 and 3 that its thermal expansion coefficiency lies within the range of $2.0 \times 10^{1a5}/°C.$ to $7.0 \times 10^{15}/°C.$ will be selected and also such a material for the heat generating member 2 that its thermal expansion coefficiency lies within the range of $1.0 \times 10^{15}/°C.$ to $4.0 \times 10^{1a5}/°C.$ will be selected so that respective thermal expansion coefficiencies of the both materials will be substantially identical to each other, thereby the breaking or disconnection of the heat generating line resulting from any difference between each of the thermal expansion coefficiencies of the both materials will be effectively prevented from occurring. That is, the selection of proper materials for the plastic films 1 and 3 and for the heat generating member 2 within the range of thermal expansion coefficiency as restricted in the above will enable it possible, in conjunction with cushioning effect of the filler 4, to prevent the breaking or disconnection of the heat generating line member.

As for the thickness of the materials to be used in practice, the plastic film material will be selected from the range of 10 to $500\mu$ and the heat generating member material will be selected from the range of 20 to $100\mu$, so that the completed product will be of thickness within the range of 100 to $600\mu$.

The method of manufacturing the electric surface heater having the above-described structure shall now be disclosed.

Referring now to FIGS. 2A to 2C, the plastic film 1 and metallic foil 2 are sequentially adhered to each other through a layer 4' of such a thermoplastic resin, supplied from an extruder 5 in a melting state, as polyethylene, vinyl chloride—vinyl acetate copolymer, nylon or the like, or a binder of nitryl rubber series, urethane series or the like, under a pressure by means of a sequential laminators 6 so that a laminated film $A$ having a metallic foil will be formed (FIG. 2A). In order to obtain a form of the heat generating line according to the present invention from said metallic foil 2 on the laminated film $A$, an anticorrosive ink against any etching ground material will be then printed in the said form on the surface of said foil 2 by means of a photogravure printing method or a sequential screen printing method. It will be understood that this printing step may be effected on the metallic foil 2 prior to the above adhering step of the plastic film 1 and metallic foil 2. The laminated film $A$ will then be dipped into such a corrosive etching ground liquid contained in an etching tank 7 as ferric chloride solution, chromic acid solution, persulfuric acid ammonia solution or the like, so that the part of metallic foil 2 not covered with the anticorrosive ink will be corroded or etched in a continuous manner, after which the laminated film $A$ will be further processed through a washing tank 8 and a drying chamber 9 and, thus, the heat generating line will be formed on the plastic film 1 (FIG. 2B). The laminated film $A$ thus etching processed and a further plastic film 3 are adhered to each other under a pressure by means of a further laminator 6', through such a thermoplastic resin 4'', supplied from an extruder 10 in a melting state, as polyethylene, vinyl chrolide—vinyl acetate copolymer, nylon or the like (FIG. 2C).

It is known that usual binders or adhesives which generally contain solvents that not much volatile are inconvenient for being painted in a thick layer. Because of this defect, when one of such adhesives is used, the recess on the laminated film $A$ after etching processed will not be completely filled with the adhesive material and, therefore, the film $A$ etching processed and plastic film 3 will have to be adhered to each other with a layer of air remained at certain portions of the recess, which will cause binding force between both films to become deteriorated. This will happen even when the adhesive material is applied to the films in a relatively thin layer. On the other hand, in the method according to the present invention, due to the fact that a thermoplastic resin in a melted condition which is easily painted in a thick layer is utilized, the recess formed after the etching process will be completely filled with the resin. Therefore, the plastic film having the metallic foil now in the form of heat generating line of the invention will be effectively jointed to the other plastic film without causing any bubbles to be remained between the both plastic films 1 and 3 so that their binding force will become excellent.

Further according to the present invention, it is easily possible to strip off one of the plastic films from the other having the etched metallic foil thereto, simply by heating the whole, since a thermoplastic resin is utilized for the filler. Therefore, line breaking portion of the metallic foil can be easily exposed by stripping off the surface plastic film at the time of such disconnection trouble and, after connecting work is established, the stripped off plastic film may be adhered again to the other film so as to cover the line by means of a heat sealing, so that the heater will be again able to be used.

An example of the manufacturing method shall be explained next.

A polyester film of $75\mu$ thick rolled in a coil form and an aluminum foil of $20\mu$ thick rolled in a coil form are set in a feed device of the laminator. After giving an anchor coating to the polyester film, heated polyethylene up to 300° C. is made to fall down from an extruder onto the film so as to be $40\mu$ thick right before the aluminum foil is applied to the film. The foil and film are pressed by means of nip rollers so as to be adhered to each other with the polyester, and then are rolled up in the form of laminated film. An anticorrosive ink will then be printed on the side of aluminum foil of the above laminated film, in a predetermined shape for the heat generating line and a layer of $25\mu$ thick, by means of the photogravure method. The laminated film thus printed will be processed through the ferric chloride solution tank, washing tank and drying chamber in a sequential manner. Leaving the anticorrosive ink on the foil as printed, said laminated film and a further polyester film of $25\mu$ thick are supplied to a further laminator with the etched surface of laminated film inside, while a further polyethylene is inserted between them so as to be in a layer of $40\mu$ thick with the above mention manner, so that the latter polyethylene layer will be fused to the polyethylene applied to the first polyester film at the former step through recessed or lost part of the aluminum foil after the etching process. Through these steps and processes, a surface heater having a high flexibility has been obtained.

Turning now to FIGS. 3A, 3B and 3C, another embodiment of the present invention shall now be referred to.

This embodiment is to provide a surface heater provided with a protective device therein for enabling the heater to sense any excessive heat by itself in the case when the surface heater generates such excessive heat due to any causes, so that any fire accident will be protected from occurring.

In FIGS. 3A and 3B, 1 is a heatproof plastic film of, for example, saturated polyester resin, and 2 is a conductor laminated on said plastic film 1 for actuating as a heat generating member, which will be arranged in a lattice or zigzag form. 11 is a plurality of electrode plate, which will be respectively positioned between each turn of said conductor with a fixed space $a$ from the conductor. Said electrode plates 11 are interconnected at peripheral part of the plastic film 1 by means of a lead wire 12. 13 is a filler of such thermosensitive organic material having a negative temperature resistive coefficiency as, for example, polyamide, polyvinyl formal or the like, and the filler 13 is filled in the space between the heat generating member 2 and respective electrode plates 11. 3 is a further heatproof plastic film covering upper surface of the heat generating member 2, electrodes 11 and filler 13.

The thermosensitive surface heater having the structure as above will be formed, as will be apparent from the foregoing, by adhering an aluminum foil to upper surface of the heatproof and insulative plastic film which is flexible and consists of, for example, saturated polyester film, printing respective forms of the heat generating member and electrodes including the lead wire for the latter on the said foil with an anticorrosive ink, effecting the etching process with a corrosive etching ground solution so that the heat generating member 2 and electrode plates 11 interconnected by the lead will be formed on the heatproof and insulative film 1 all with the same metal material in a plane surface structure, filling the thermosensitive organic material into spaces between the heat generating member 2 and respective electrode plates 11, and then covering the upper surface of the above structure with a further heatproof and insulative plastic film 1'.

Thus formed thermosensitive electric surface heater will be used in the following manner.

As shown in FIG. 3C, both of initial and tail ends of the heat generating conductor member 2 will be connected through a switch 14 to respective terminals of a power source 15, and a protecting device 16 is interconnected between the lead wire 12 for the electrodes 11 and a lead wire 17 from the member 2 to the switch 14. The arrangement is such that, when an extraordinary heat is generated due to some reason, resistive value of the thermosensitive organic material 13 filled between the heat generating member 2 and electrodes 11 will be lowered and, thus, a leakage current will flow through the filler 13 to any of the electrodes 11, so that the protecting device will be actuated so as to open the switch 14, thereby power supply to the heat generating member 2 will be interrupted.

Since in the thermosensitive electric surface heater as shown in the above embodiment the heat generating member 2 and electrodes 11 are arranged with a certain space between them on the heatproof and insulative film 1 in a plane form and the thermosensitive organic material having a negative temperature resistive coefficient is filled in the space between the member 2 and electrodes 11, the heater will never cause any inconveniences in using the same as any of thin type floor heater or roof heater.

Turning next to FIGS. 4A and 4B the structure of another embodiment of the invention will be disclosed, in which 1 is the heatproof and insulative plastic film, 2 is the electrically heat generating member and 11 is the electrode plate. The heat generating member 2 and a plurality of the electrode plate 11 are arranged as shown in FIG. 3A so as to enter into each other but as spaced with a certain fixed distance. 13 is a film of such thermosensitive organic material as polyethylene, polyamide or the like, 13′ is a melted resin layer of likewise the polyethylene, polyamide or the like, and said thermosensitive film 13 is adhered to the heat generating member 2 and electrode plates 11 with the layer 13′ as a binding agent. 18 is a metallic layer formed on the other surface of said film 13 by way of vacuum evaporation, and is covered with a further heatproof insulating film 3.

The surface heater having the structure as above will be interconnected so as to form such circuits as shown in FIGS. 4C and 4D for the purpose of practical use. In the drawings, 14 is a switch, 15 and 15′ are power sources, 16 is a protective device, and 20 is a diode. In these wirings, if an extraordinary temperature rise is cause to occur at the point X, electric resistivity of the thermosensitive organic film 13 will be lowered and, thus, a leakage current will be caused to flow to the protective device 16 so as to open the switch 14.

In the surface heater of the above structure, a controlling voltage is impressed to the metallic layer 18 and, therefore, respective electrode plates 11 and metallic layer 18 will have the same potential at any place so that there exists the same electric voltage at any portion of them with respect to each other. This is effective in enabling the heater circuit to have the same sensitivity and, thus, to detect any abnormal condition at any place with a uniform sensitivity. Further, it is made possible to provide the heater which is highly flexible and is adapted to be manufactured in a continuous manner, since the same is formed of a synthetic resin and a metallic foil or vacuum evaporated metallic layer.

FIG. 5A shows a further embodiment of the invention, in which 21 is a thermofusing resin layer adhered to a surface of a saturated polyester film 22. 2 is a heat generating member, which is formed by adhering a metallic foil to inner surface of the saturated polyester film 22 through any of thermoplastic resin such as polyethylene, nylon or the like, polyurethane adhesive, rubber series adhesives and the like, and effecting the etching process with respect to the foil so as to remove unnecessary portions therefrom. To the other exposed surface of thus formed heat generating member 2, a further saturated polyester film 22 and a further thermofusing resin layer 21 will be adhered.

Connecting method of the surface heater having the above structure to power supplying lead wires shall be explained with reference to FIGS. 5A and 5B. Prior to the connection, the thermofusing resin layer 21 and saturated polyester film 22 are partly removed from one of the both sides of the heater so as to expose the heat generating member 2, and a power supplying lead wire 23 is then connected to said exposed portion of the member 2. Then, the lead wire 2 will be rolled up with the saturated polyester film 22. Consequently the thermofusing resin layer 21 adhered behind the film 22 will be exposed around the roll.

Thus rolled up saturated polyester film 22 having the lead wire 23 inside will then be inserted into a sealing tube 24 for the connecting part having a thermofusing resin layer 21 at its inner wall and, thereafter, the tube 24 will be heated under a pressure from outside, thereby the thermofusing resin layers 21 at both of the inner wall of the tube 24 and the outside surface of the rolled up polyester film 22 will be jointed to each other so that a complete sealing of the connection part may be established. It will be readily understood that the above connecting method is applicable to any embodiments as illustrated in FIGS. 3 and 4.

FIG. 6A shows a further embodiment of the present invention, in which 1 is an insulative film, 2 is a plurality of linear heat generating member interconnected to each other at an end, 4 is an adhesive layer of thermoplastic resin, and 25 is a transparent sheet of plastics or glass. This embodiment is an example of the heater, on the whole surface of which a design is formed by means of the heat generating member 2. In order to form this design, width of the respective linear members 2 and hence the space between each adjacent one of the members 2 will be varied, so that sequential pattern of thus varied width of the members 2 will form any of the design or letter. In the case when the heat generating member is formed to designate, for example, a picturesque design, it is possible to obtain a surface heater having a decoratively designed metal sheet for use of setting on floor surfaces or adhering to wall surfaces. Further in case the member is designating letters, it will be possible to provide such heater that designates itself the manufacture's identification or manufacturing numbers and so on, without needing of such conventional labels to be adhered to the productions that will often be stripped off after a long use.

FIG. 6B is to show another embodiment, in which case a certain number of dots or lines respectively arranged so as to represent as a whole any of letters or designs. In the drawing, 1 is an insulative film, 2 is a heat generating member in a zigzag form, and 26 is a designation formed of dots or lines which are respectively formed on the insulative film 1 between each turn of the heat generating member 2. It will be preferable to utilize the same material for the dots or lines of the designation with the one used for the heat generating member.

It will be also understood that the embodiments as disclosed with reference to FIGS. 6A and 6B will be readily applicable to the embodiments of FIGS. 3 and 4.

A still further embodiment of the invention is shown in FIG. 7, in which 1 is an insulative film and 2 is a heat generating member. Said member 2 is provided with a wider width part B at the periphery and a narrower width part C at the central section, so that the resistance of the member 2 per a unit of area will be varied and, thus, the heat distribution as generated with the resistance will be varied. By varying thus the amount of heat generated at each unit area, it is possible to produce various types of the electric surface heater in response to various usages. In the case, for example, of using the surface heater by installing against interior wall of houses, the portion of such surface heater to be located at lower part of the wall may be adapted to produce a larger amount of heat so that such defect that hot air tends to go upward and lower space becomes colder will be effectively prevented.

FIGS. 8A and 8B are to show a further embodiment of the invention, which is adapted to make insulation work for peripheral part of the electric surface heater according to the invention more simply carried out. In the drawings, 1 is a heatproof and insulative film, 2 is a linear heat generating member, and 27 is a lead conductor circuit. Said heat generating member 2 will be arranged and connected between two lead conductor circuits 27 arranged so as to be parallel to each other, so that a block 28 will be formed. In order to carry out the electric insulation at peripheral edge of the above structure when the surface heater is cut along the chain line 29 in FIG. 8A, the cut edge part will be folded down in the longitudinal direction of the heater as shown in FIG. 8B, then the folded edge will be processed by means of an ultrasonic or high frequency welding so that the folded films 1 and 3 will be fused to each other and thus fixed firmly.

What we claim is:

1. A flexible, crack resistant electric surface heater comprising the combination of a metal foil heat generating element, terminals for connecting said heat generating element to an electrical source of energy at least two insulating plastic films disposed on opposite sides of and surrounding said heat generating element, said heat generating element being continuously bonded to said insulating elements by an adhesive bonding agent, said heating element is formed in a zigzag pattern and said bonding agent is a thermoplastic resin which is utilized as a filler element to completely surround said heat generating element, completely filling the empty spaces created by said heat generating element being formed in a zigzag pattern, and completely filling any cavities existing in the surface of said heating element so that there are substantially no voids or airspaces within the enclosure created by said insulating elements and said metal foil heat generating element and said plastic insulating elements being constructed of materials having substantially identical thermal coefficients of expansion, said thermal coefficients of expansion are within the range of $2.0 \times 10 /° C.$ to $4.0 \times 10 /° C.$